United States Patent [19]
Krude et al.

[11] Patent Number: 5,333,939
[45] Date of Patent: Aug. 2, 1994

[54] WHEEL HUB/CONSTANT VELOCITY JOINT UNIT

[75] Inventors: Werner Krude, Neunkirchen-Wolperath; Peter Harz, Hennef; Herbert Frielingsdorf, Lohmar, all of Fed. Rep. of Germany

[73] Assignee: GKN Automotive AG, Siegburg

[21] Appl. No.: 61,276

[22] Filed: May 12, 1993

Related U.S. Application Data

[63] Continuation of Ser. No. 732,396, Jul. 18, 1991, abandoned.

[30] Foreign Application Priority Data

Jul. 19, 1990 [DE] Fed. Rep. of Germany ....... 4023019

[51] Int. Cl.[5] .............................................. F16C 13/00
[52] U.S. Cl. ................................. 301/124.1; 384/537; 464/178
[58] Field of Search .................. 301/105.1, 111, 124.1, 301/126, 131; 384/537; 464/178, 906; 180/258, 259

[56] References Cited

U.S. PATENT DOCUMENTS

| | | | |
|---|---|---|---|
| 3,583,511 | 6/1971 | Asberg | 180/259 X |
| 4,116,020 | 9/1978 | Aucktor et al. | 464/906 X |
| 4,537,270 | 8/1985 | Brandenstein et al. | 180/259 X |
| 4,629,028 | 12/1986 | Krude et al. | 180/259 |
| 4,835,829 | 6/1989 | Welschof et al. | 464/906 X |
| 4,858,998 | 8/1989 | Welschof et al. | 180/258 X |
| 4,887,917 | 12/1989 | Troster et al. | 301/105 R X |
| 4,943,171 | 7/1990 | Hofmann et al. | 180/259 X |

FOREIGN PATENT DOCUMENTS

| | | |
|---|---|---|
| 1915932 | 10/1969 | Fed. Rep. of Germany . |
| 3009199 | 9/1981 | Fed. Rep. of Germany . |
| 2408473 | 11/1977 | France . |
| 2511950 | 8/1981 | France . |
| 1331451 | 9/1973 | United Kingdom . |
| 1421721 | 1/1976 | United Kingdom . |
| 2007801 | 5/1979 | United Kingdom . |

*Primary Examiner*—Russell D. Stormer
*Attorney, Agent, or Firm*—Harness, Dickey & Pierce

[57] ABSTRACT

A wheel hub/constant velocity joint unit has a two-row wheel bearing with a common outer bearing race (16). A joint member (4) with an end sleeve (5) is slid on to the wheel hub (1) and connected thereto while the wheel bearing is in a pretensioned condition. The connection of the hub (1) and joint member (4) is effected by a weld (23, 24, 29) located in the region of a plug-in connection between the externally positioned end sleeve (5) of the joint member (4) and the internally positioned wheel hub (1).

17 Claims, 5 Drawing Sheets

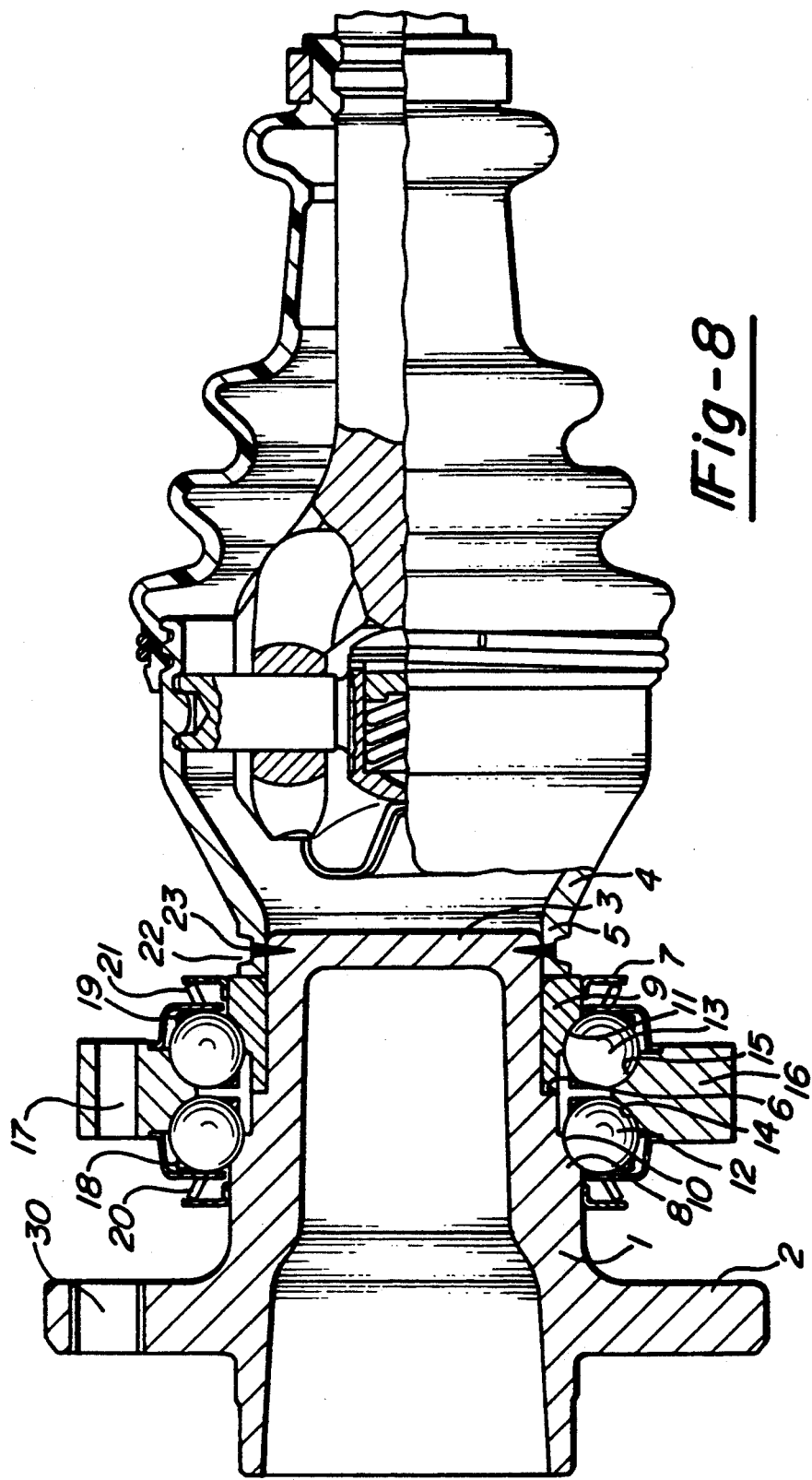

WHEEL HUB/CONSTANT VELOCITY JOINT UNIT

This is a continuation of U.S. patent application Ser. No. 732,396, filed Jul. 18, 1991 and now abandoned.

BACKGROUND AND SUMMARY OF THE INVENTION

The invention relates to a wheel hub/constant velocity joint assembly with a double-row wheel bearing. An end sleeve of a joint member is slid on to the wheel hub and affixed thereto while the wheel bearing is in a pretensioned condition.

One type of design can be found in DE AS 19 15 932. For example, where an outer joint member is slid on to the teeth of the wheel hub and then fixed thereon by deforming the wheel hub end, because of the need for a set of teeth, this type of non-rotating connection between the joint member and wheel hub is complicated and expensive. Since the pretension of the wheel bearing has to be set very accurately, the process of deforming the end of the wheel hub is unsuitable for this purpose.

It is the object of the present invention to provide a wheel hub/constant velocity joint assembly which enables exclusive use of axially assembled double-row bearings. The bearings include a large number of balls and also provide an advantageous connection suitable for setting the pretension of the bearing. The objective is achieved by a weld located near a plug-in connection between the externally positioned end sleeve of the joint member and the internally positioned wheel hub.

In the case where a joint member with an internally cylindrical sleeve portion is slid over the externally cylindrical wheel hub, this type of connection enables accurate setting of the pretension of the axially assembled wheel bearing. The connection is by a weld produced at a sufficient distance form the bearing to ensure a secure connection. The weld is generally produced by laser energy which is a particularly suitable method. It is possible to use one or several complete circumferential welds. However, it is also possible to use spot welds or welds having a chord shape.

In a first advantageous design, a weld bead is placed in the gap between the wheel hub and the end sleeve of the joint member. According to an alternative advantageous embodiment, the weld penetrates the end sleeve in a substantially radially direction and penetrates into the wheel hub. In the latter case, it is possible, radially and mechanically, to introduce countersinks or partial grooves or even through-holes or slots into the externally positioned sleeve of the joint member in order to shorten the welding operation and to produce larger through-welded regions.

In a first advantageous embodiment, there are provided two separate inner bearing races which are slid on to the wheel hub. One of the bearing races is supported on a contact shoulder of the wheel hub, especially an integral wheel flange, and the other is loaded by the end face of the joint member. Such designs are particularly suitable if the wheel hub and/or the joint member consist of relatively thin-walled plate-metal parts.

By deviating from the above, it is also possible to provide only one separate inner bearing race which is slid on to the wheel hub and supported on a stop at the wheel hub. The bearing race is loaded at the other end face by the joint member. The joint member includes a roller bearing track formed directly in the joint member. This design is preferred if the joint member is thick-walled, especially if it forms a solid ball hub.

Alternatively, the roller bearing track may be formed directly in the wheel hub. In this case, there is one separate inner bearing race which is supported on a stop on the wheel hub. The bearing race is loaded at the other end face by the joint member. This design is advantageous if, contrary to the above, the wheel hub is a forged or cast component with a greater wall thickness.

The two latter variants may also be combined in such a way that one rolling member track is formed directly on the wheel hub and the other rolling member track directly on the joint member.

In another advantageous embodiment, the wheel hub may be provided with an end which extends perpendicularly relative to its axis and in whose region the welds would preferably be provided.

In the case of a wheel hub designed as a formed plate-metal part, a plate-metal plug may be inserted into the wheel hub at the wheel flange end. The plug serves to stiffen the wheel hub and the wheel flange and also to center a wheel to be positioned on the hub.

From the following detailed description taken in conjunction with the accompanying drawings and subjoined claims, other objects and advantages of the present invention will become apparent to those skilled in the art.

DETAILED DESCRIPTION OF THE DRAWINGS

The preferred embodiments of the invention are illustrated in the drawing wherein:

FIG. 8 is a longitudinal cross sectional view like that of FIG. 7 of another embodiment in accordance with the present invention.

DETAILED DESCRIPTION OF THE PREFERRED EMBODIMENTS

Figure 1:
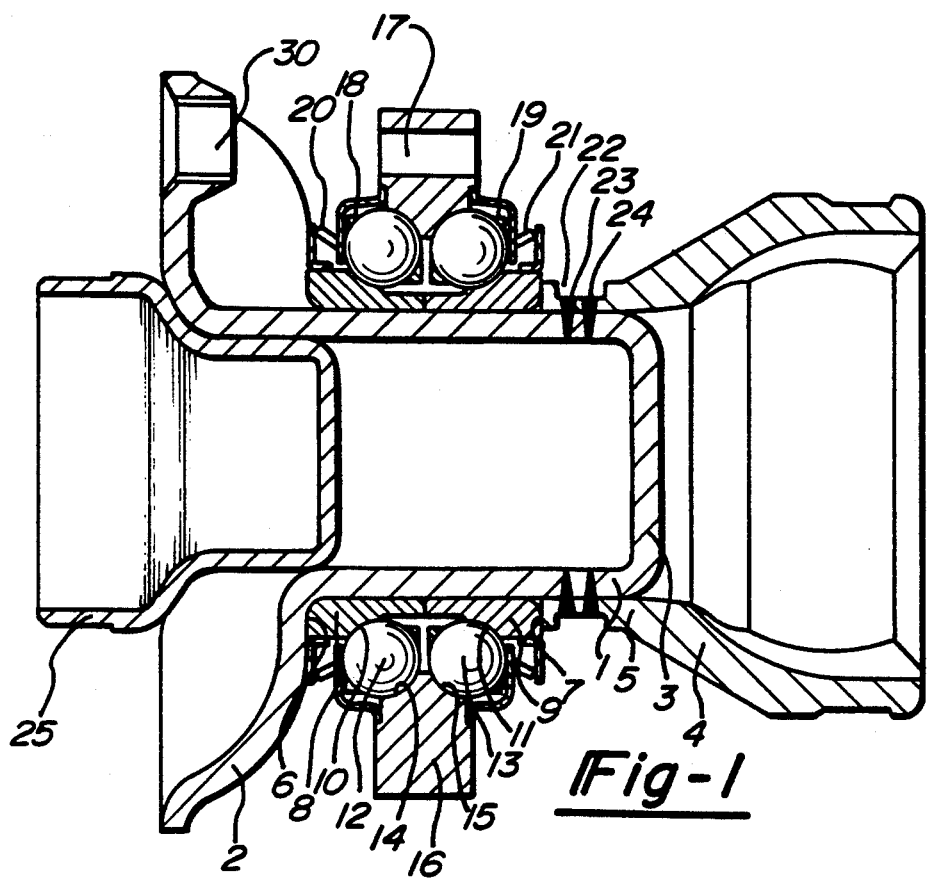
FIG. 1 is a longitudinal cross sectional view of a wheel hub with a constant velocity outer joint member in accordance with the present invention.

Any parts which correspond to each other in the various figures have been given the same reference numeral.

Figure 2:
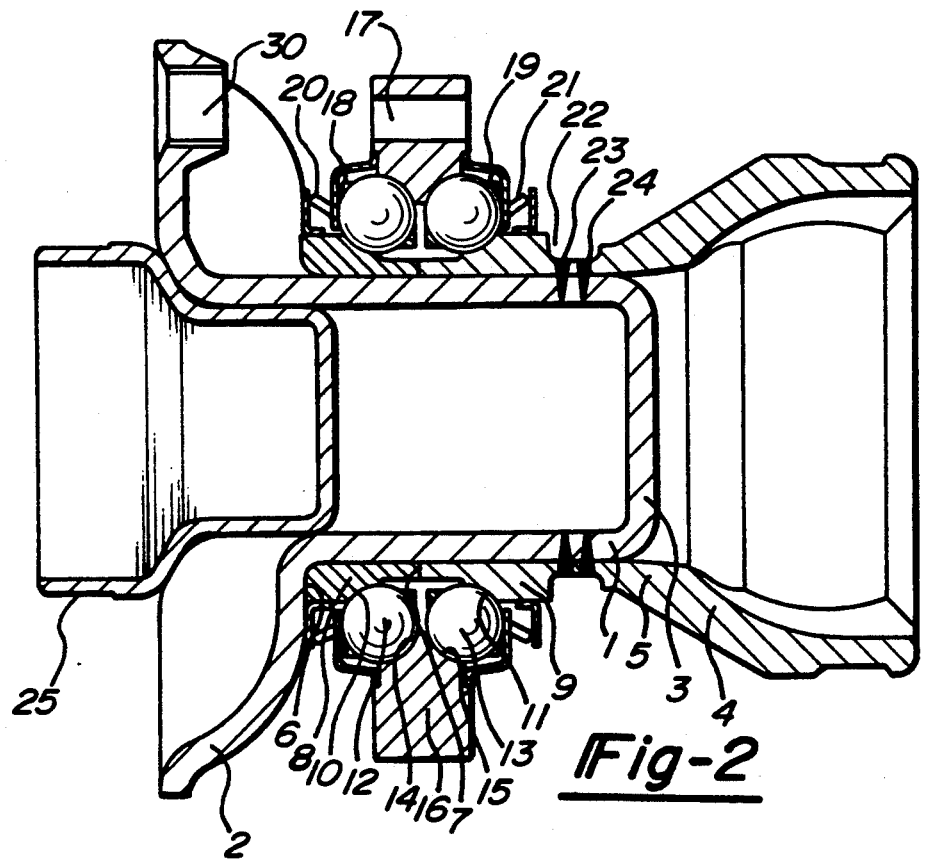
FIG. 2 is a longitudinal cross sectional view like that of FIG. 1 of another embodiment in accordance with the present invention.

FIG. 1 shows an integral wheel hub 1 formed of plate metal with a deformed wheel flange 2 and a terminal closed end 3. An outer constant velocity joint part 4 with an open end sleeve portion 5 is slid on to the wheel hub 1. The flange 2 includes a contact shoulder 6 which abuts an inner race 8 of the bearing assembly. The sleeve portion 5 includes an end face 7 which abuts an inner race 9 of the bearing assembly. The two individual inner bearing races 8, 9 are tensioned between the shoulder and end face 7. Each race 8 and 9 includes an inner roller bearing track 10 and 11 for the bearing balls 12 and 13, as seen in FIGS. 1 and 2. Also outer rolling bearing tracks 14 and 15 are provided in a common outer bearing race 16. The outer race 16 includes bolt holes 17 which enable stationary positioning of the assembly. Ball cages 18 and 19 and sealing elements 20, 21 are included with the bearing assembly.

A plug-like cover 25, formed from sheet metal, is inserted into and possibly welded to the opposite end of the wheel hub 1. The cover 25 serves to center the wheel on the assembly and to stiffen the wheel flange 2 and hub 1. The open end sleeve portion 5 of the outer joint member 4 is provided with a circumferential groove 22 including two welding beads 23 and 24 extending radially and penetrating the wheel hub 1.

In deviating from FIG. 1, FIG. 2 illustrates inner bearing race 9 integrally formed with the outer joint member 4. The joint member 4 also includes rolling member track 11. The end face 7 of the outer joint member 4 is in direct contact with the separately produced inner bearing race 8 which, in turn, abuts shoulder 6 of the wheel flange 2 to maintain tension in the bearing assembly. The remaining elements correspond to those previously described.

Figure 3:
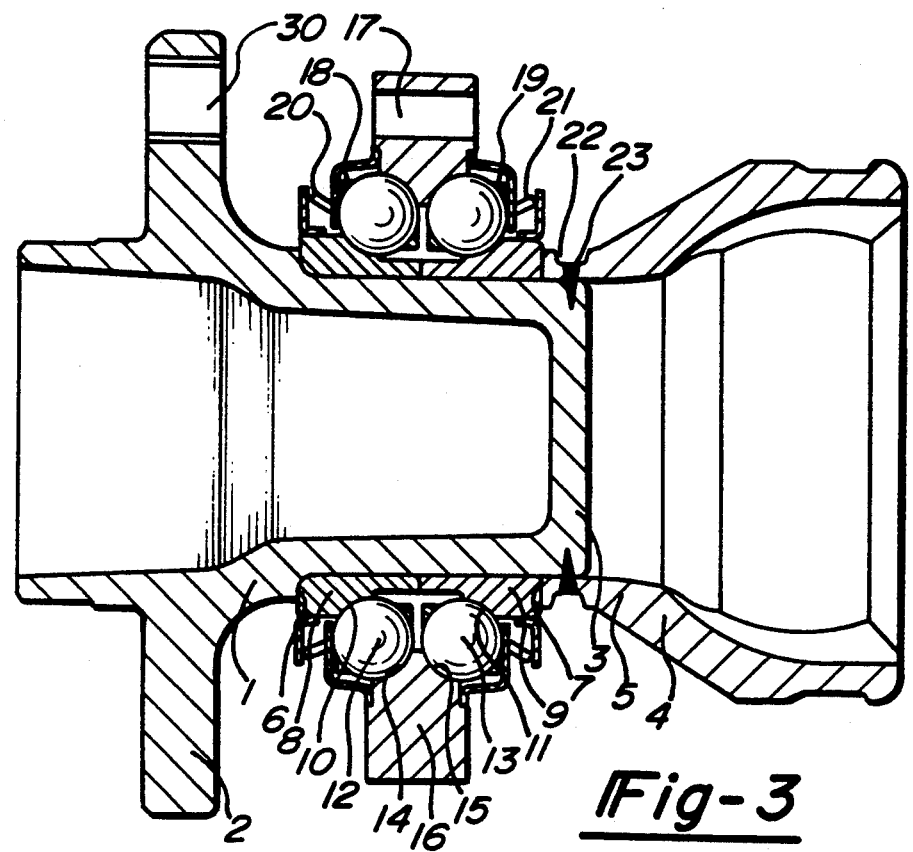
FIG. 3 is a longitudinal cross sectional view like that of FIG. 1 of another embodiment in accordance with the present invention.

FIG. 3 is substantially the same as FIG. 1, however, the wheel hub 1 deviates in that it is produced as a solid formed part. In this case, the hub 1 does not need a separate cover at the open wheel end. The closed end 3 of the wheel hub is positioned below a circumferential groove 22 at the open end portion 5 of the outer joint member 4. Thus, a single welding bead 23 is shown to secure the joint member 4 on the hub 1.

Figure 4:
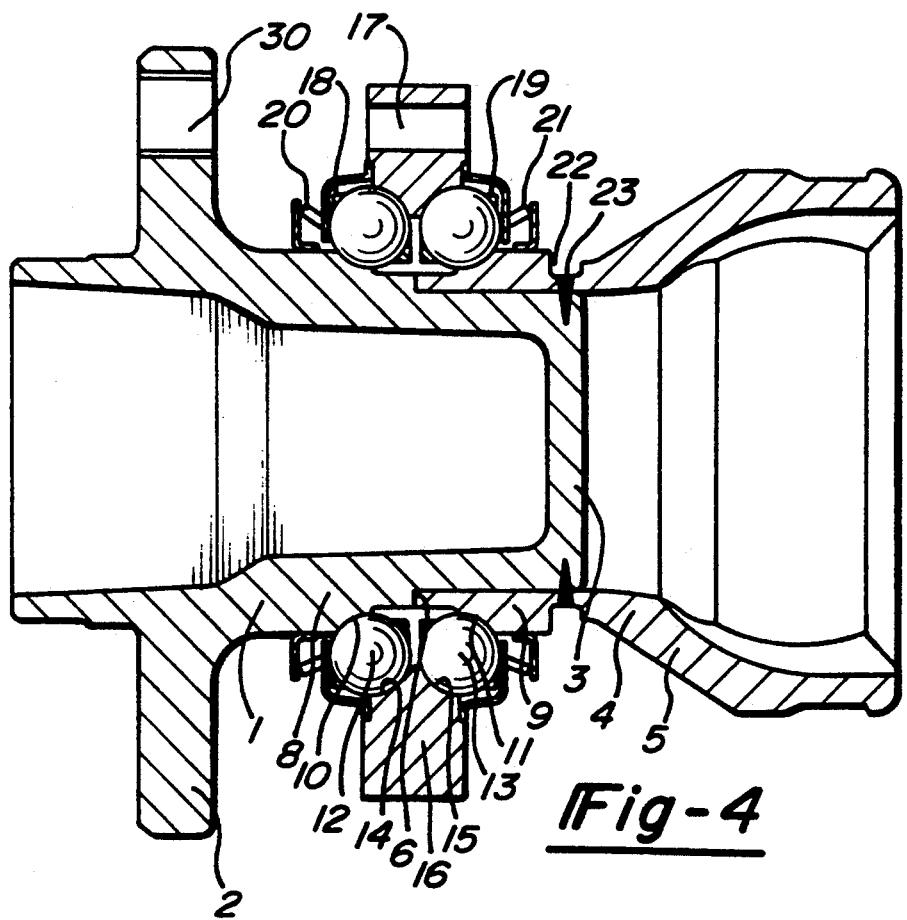
FIG. 4 is a longitudinal cross sectional view like that of FIG. 1 of another embodiment in accordance with the present invention.

FIG. 4 is substantially the same as FIG. 3, however, the inner bearing race 9 is integrally formed with the end sleeve portion 5 of the joint member 4 and the inner bearing race 8 is integrally formed with the hub 1. Thus, the rolling member tracks 11 and 10 are provided directly in the outer joint member 4 and in the wheel hub 1 as seen in FIG. 4.

Figure 5:
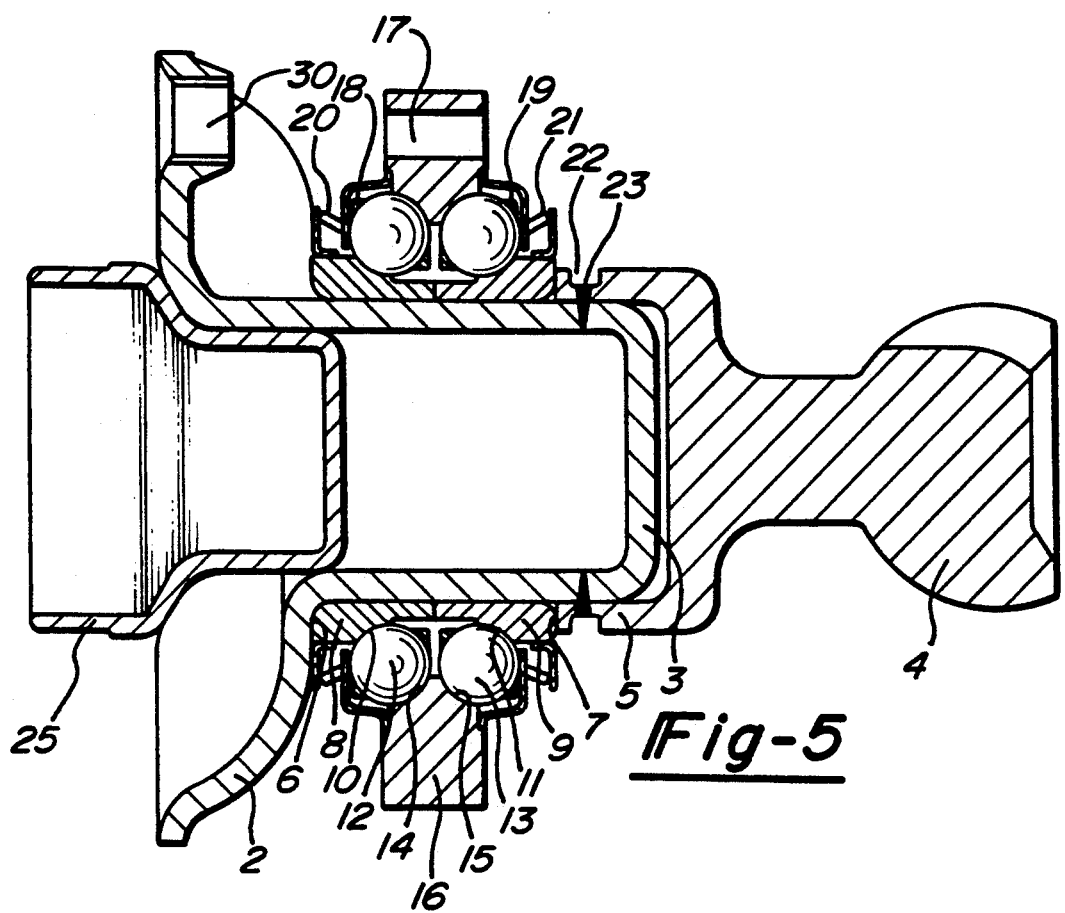
FIG. 5 is a longitudinal cross sectional view of a wheel hub with a constant velocity inner joint member in accordance with the present invention.

FIG. 5 is substantially the same as FIG. 1, however, the joint member 4 deviates in that it is designed as an inner joint member or ball hub. The joint member 4 includes a sleeve-shaped end portion 5 with a circumferential groove 22 with a single welding bead 23 retaining the joint member 4 to the wheel hub 1.

Figure 6:
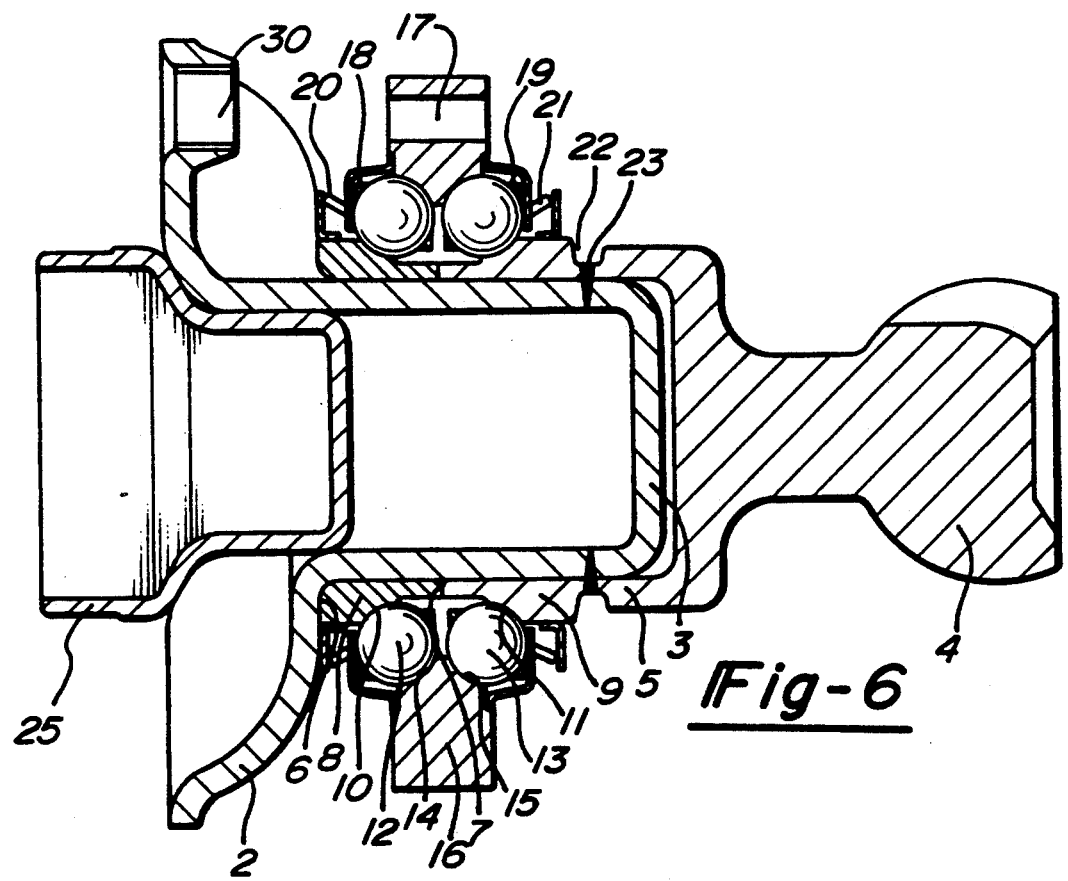
FIG. 6 is a longitudinal cross sectional view like that of FIG. 6 of another embodiment in accordance with the present invention.

FIG. 6 is substantially the same as FIG. 5, however, the inner bearing race 9 is integral with the end portion 5 of the joint member 4 like that of FIG. 3. The end face 7 rests directly against the separate inner bearing race 8 which, in turn, abuts the shoulder 6 of the wheel flange 2 as seen in FIG. 6.

Figure 7:
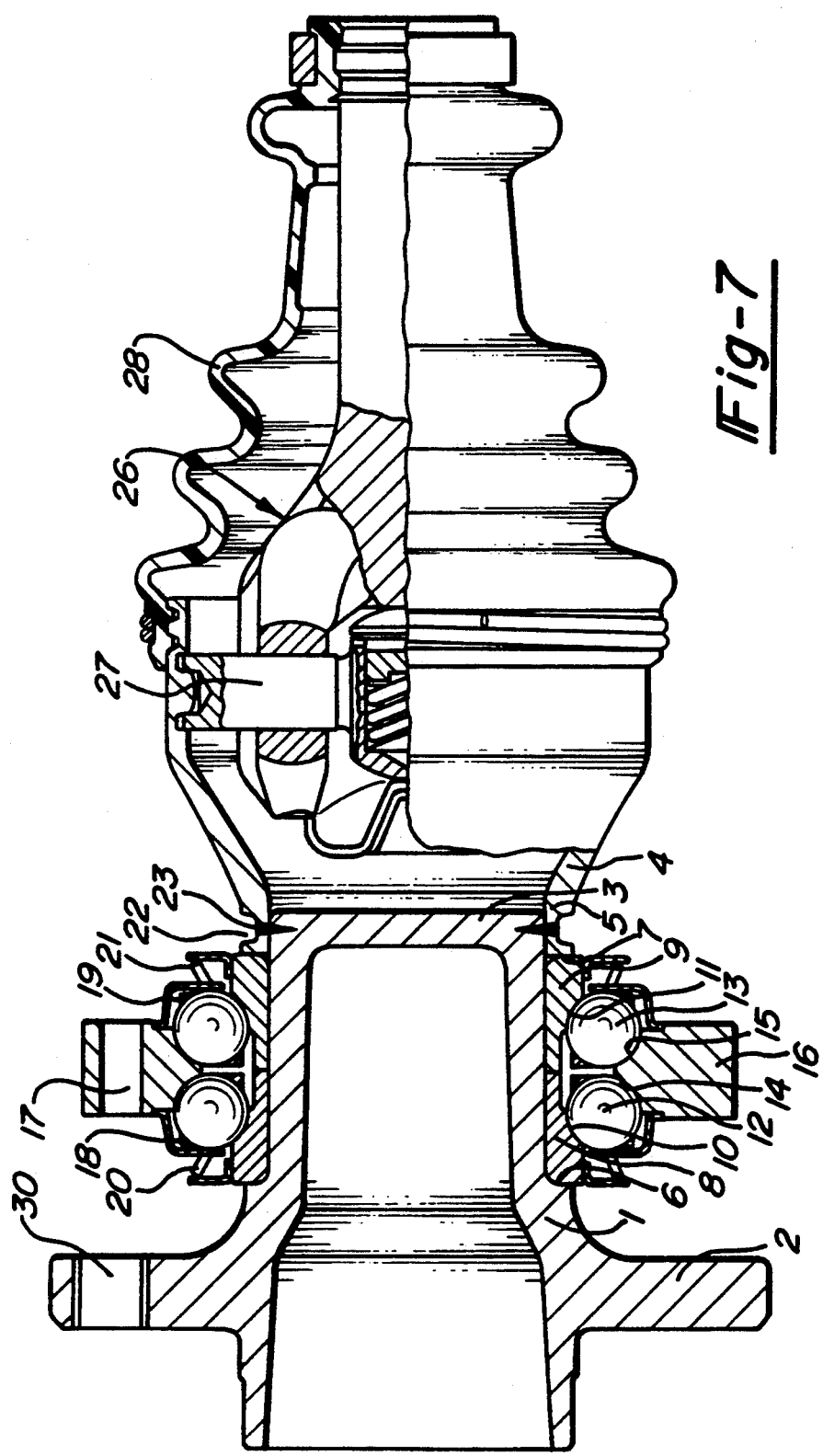
FIG. 7 is a longitudinal cross sectional view of a wheel hub with a constant velocity joint assembly in accordance with the present invention.

FIG. 7 illustrates a wheel hub and constant velocity joint assembly which is substantially identical to that shown in FIG. 3. The wheel hub 1, wheel flange 2 and bearing are substantially the same as previously described. The joint member 4 deviates in that it is formed as a plate metal outer sleeve of a tripod joint 26 into which a tripod star 27 is inserted. The joint is sealed with a convoluted boot 28.

FIG. 8 is similar to FIG. 7, however, the inner bearing race 9 is integrally formed with the wheel hub 1 and the wheel flange 2. The rolling member track 10 is provided directly on the wheel hub 1.

While the above detailed description describes the preferred embodiment of the present invention, the invention is susceptible to modification, variation, and alteration without deviating from the scope and fair meaning of the subjoined claims.

We claim:

1. A wheel hub/constant velocity joint assembly comprising:
   a wheel hub having an elongated cylindrical sleeve portion;
   a two-row wheel bearing including a common outer bearing ring, two rows of roller means and at least one inner bearing ring separate from the wheel hub, said two row wheel bearing positioned on said elongated cylindrical sleeve portion of said wheel hub;
   a joint member of a constant velocity joint having an end sleeve circumferentially positioned about a portion of said elongated cylindrical sleeve portion on said wheel hub adjacent an axially inner bearing ring for providing a tension force in said two row wheel bearing;
   aperture means for receiving a weld, said means circumferentially distributed about said joint member end sleeve;
   a weld affixing said joint member to said hub while the two row wheel bearing is in a pretensioned condition; and
   said weld being generated substantially radially about said sleeve in said weld receiving means and penetrating the sleeve of the joint member and penetrating into the wheel hub.

2. The assembly according to claim 1 wherein said weld is circumferentially positioned about said hub.

3. The assembly according to claim 1 wherein said weld is a plurality of chord shaped welds circumferentially distributed about said hub.

4. The assembly according to claim 1 wherein said weld is a plurality of spot welds circumferentially distributed about said hub.

5. The assembly according to claim 1 wherein said weld is located in a countersink or bores or slots in said sleeve.

6. The assembly according to claim 1 further comprising a pair of separate inner bearing races positioned on the wheel hub, one of said inner bearing races abutting a contact shoulder on the wheel hub, and the other one being loaded by an end face of said joint member.

7. The assembly according to claim 1 further comprising a separate inner bearing race on said wheel hub abutting a contact shoulder and said joint member including a roller bearing track formed directly in the joint member and said joint member abutting the other side of said inner bearing race.

8. The assembly according to claim 1 wherein a roller bearing track is formed directly in the wheel hub and a separate inner bearing race abutting a contact shoulder on the wheel hub and being located by an end face of the joint member.

9. The assembly according to claim 1 wherein one rolling member track is formed directly on the wheel hub and the other rolling member track is formed directly on the joint member.

10. The assembly according to claim 1 wherein said wheel hub includes an end portion directed towards the joint member.

11. The assembly according to claim 10 wherein said at least one weld is positioned adjacent said end portion.

12. The assembly according to claim 1 wherein said at least one weld is positioned in a circumferential groove on said end sleeve.

13. The assembly according to claim 1 wherein said wheel hub is a formed plate-metal part.

14. The assembly according to claim 1 wherein said joint member is the outer joint member.

15. The assembly according to claim 1 wherein said joint member is a ball hub.

16. The assembly according to claim 1 wherein said joint member is a formed plate-metal part of a tripod joint.

17. A wheel hub/constant velocity joint assembly comprising:
- a wheel hub with an overall bowl shape and having an elongated cylindrical sleeve portion and a terminal bottom closing off the hub;
- a two-row wheel bearing including a common outer bearing ring, two rows of roller means and at least one inner bearing ring separate from the wheel hub, said two row wheel bearing positioned on said elongated cylindrical sleeve portion of said wheel hub;
- a joint member of a constant velocity joint having an end sleeve circumferentially positioned on said wheel hub about a portion of said elongated cylindrical sleeve portion and said bottom adjacent an axially inner bearing ring for providing a tension force in said two row wheel bearing;
- a weld affixing said joint member to said hub while the two row wheel bearing is in a pretensioned condition; and
- said weld being generated substantially radially about said sleeve, adjacent said terminal bottom and penetrating the sleeve of the joint member and penetrating into the wheel hub.

* * * * *